Jan. 10, 1928.
F. J. BASS
1,656,133
CULTIVATOR ATTACHMENT
Filed July 13, 1926
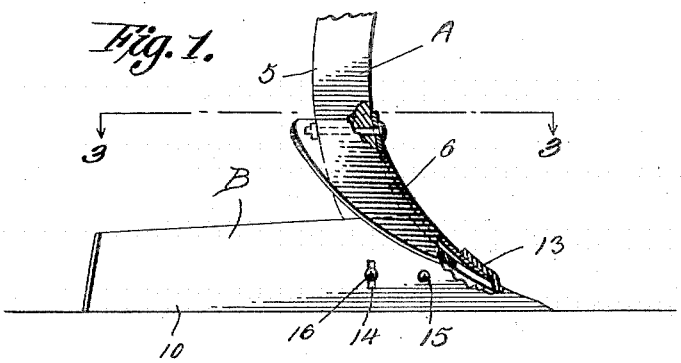
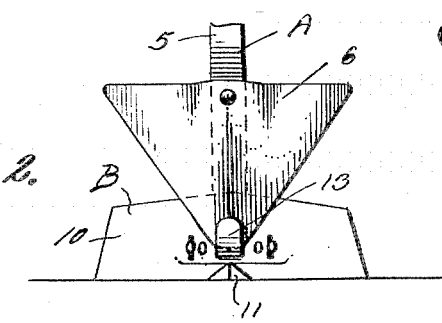 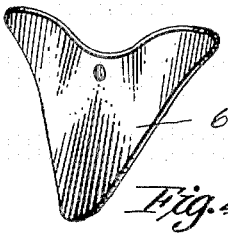
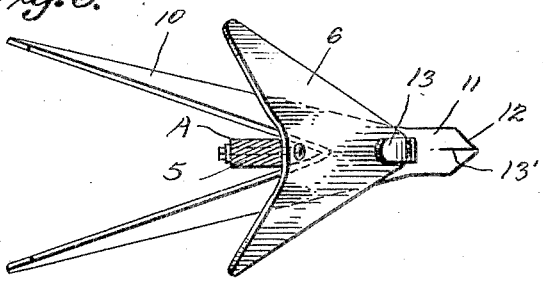
WITNESSES
Guy M Spring
Inventor
FRANK J. BASS
By Richard B Owen, Attorney Patented Jan. 10, 1928.

1,656,133

UNITED STATES PATENT OFFICE.

FRANK J. BASS, OF WOODSON, TEXAS.

CULTIVATOR ATTACHMENT.

Application filed July 13, 1926. Serial No. 122,221.

This invention appertains to cultivators and more particularly to a novel attachment for connection with such cultivators for facilitating the working of the ground and the uprooting of cotton stalks, rocks and the like.

The primary object of the invention is the provision of an uprooting blade connected with the cultivator foot and share, such blade forming means for coacting with the cultivator share for uprooting stalks and rocks.

A further object of the invention is the provision of novel means for connecting said blade with the cultivator foot and share whereby accidental displacement thereof is precluded.

A still further object of the invention is to provide an attachment for cultivators of the above character, which will be durable and efficient in use, one that will be simple and easy to manufacture, and one which can be placed upon the market and incorporated with a conventional cultivator at a small cost.

With these and other objects in view, the invention consists in the novel construction, arrangement and formation of parts, as will be hereinafter more specifically described, claimed, and illustrated in the accompanying drawings, in which:—

Figure 1 is a fragmentary side elevation of a cultivator showing my preferred embodiment incorporated therewith, Figure 2 is a front elevation of the same, Figure 3 is a horizontal section taken on the line 3—3 of Figure 1 looking in the direction of the arrows, and Figure 4 is a perspective view of the cultivator share.

Referring to the drawings in detail, wherein similar reference characters designate corresponding parts throughout the several views, the letter A generally indicates the cultivator and B the attachment therefor.

As stated the cultivator A is of the conventional form and can be of any desired type or make and includes the foot 5 having the cultivator or plow share 6 connected therewith in the usual way.

The improved attachment B is utilized in conjunction with the cultivator or plow share 6 and comprises a pair of diverging blades 10 which are adapted to lie on opposite sides of the foot 5. If preferred these blades can gradually narrow toward their rear ends. At the meeting point of the blades 10, the attachment is provided with a penetrating and uprooting point 11. This point extends forwardly of the blades and lies substantially in a horizontal plane parallel with the lower edges of the blades 10. As shown the point 11 has its forward end provided with tapered cutting faces 12 and a central cutting rib 13'.

In accordance with the invention the meeting points of the blades 10 directly above the point 11 is provided with an upstruck tongue 13 which is adapted to receive the conventional cultivator or plow share 6 for protecting the point of such share and for facilitating the connection of the attachment with the cultivator. The blades 10 directly in rear of the point 11 are provided with transversely alined openings and a pair of transversely alined slots 14. A pivot bolt 15 extends through the openings and the cultivator foot 5 and this bolt serves as means for rockably connecting the attachment in place. An adjusting bolt 16 extends through the foot 5 and the slots 14, which are arranged substantially in a vertical plane and it is obvious that by tightening such bolt that the angle of the attachment can be maintained as desired.

The improved device cooperates with a share 6 and when in use, serves as means for opening up the ground and uprooting old cotton and corn stalks and throwing the same to one side. The device is particularly advantageous for use in rocky soil as the ordinary share is protected and thus the resharpening thereof is eliminated.

Changes in details may be made without departing from the spirit or the scope of this invention, but:

What I claim as new is:

1. The combination with a cultivator including a foot and a share, of an attachment therefor comprising a blade connected with the foot and a penetrating point arranged forwardly of the foot, and a struck out tongue for receiving the point of the share.

2. The combination with a cultivator including a foot and a share, of an attachment for the cultivator comprising a pair of diverging blades disposed on opposite sides of the foot and a penetrating point at the point of meeting of said blades, said point lying substantially in a horizontal plane and in the same plane with the lower edges of the blade, and a struck out tongue on said attachment at the meeting point of the blades and directly above said point for receiving the lower end of the share.

3. The combination with a cultivator including a foot and a share, of an attachment for the cultivator comprising a pair of diverging blades disposed on opposite sides of the foot and a penetrating point at the point of meeting of said blades, said point lying substantially in a horizontal plane and in the same plane with the lower edges of the blade, a struck out tongue on said attachment at the meeting point of the blades and directly above said point for receiving the lower end of the share, means rockably connecting the blades to the foot and means extending through the blades and foot for holding the attachment in an adjusted angular position on the foot.

4. An attachment for uprooting cotton stalks and the like for use in conjunction with cultivators comprising a pair of diverging blades and a forwardly extending penetrating point at the conjunction of said blades, and an upstruck tongue at the meeting point of said blade and arranged above the pentrating point.

5. The combination with a cultivator including a foot and a share, of an attachment for the cultivator comprising a pair of diverging blades disposed on opposite sides of the foot, and a penetrating point at the point of meeting of said blades, said point lying substantially in a horizontal plane and in the same plane with the lower edges of the blades, means rockably connecting the blades to the foot, and means extending through the blades and the foot for holding the attachment in an adjusted angular position on the foot.

In testimony whereof I affix my signature.

FRANK J. BASS.